United States Patent [19]
Popovic

[11] Patent Number: 5,240,501
[45] Date of Patent: Aug. 31, 1993

[54] MATERIAL FOR HEAT AND ELECTRICAL INSULATION WITH A CAPACITY OF SELECTIVE ABSORPTION OF ELECTROMAGNETIC RADIATION SPECTRUM AND VIBRATION, ITS PRODUCTION PROCESS AND USE

[76] Inventor: Vidosava Popovic, Narodnog fronta 19/3, 11000 Belgrade, Yugoslavia

[21] Appl. No.: 873,973

[22] Filed: Apr. 24, 1992

Related U.S. Application Data

[63] Continuation of Ser. No. 541,999, Jun. 22, 1990, abandoned.

[30] Foreign Application Priority Data

Jun. 23, 1989 [YU] Yugoslavia ............... P-1290/89

[51] Int. Cl.$^5$ .................................................. C04B 2/02
[52] U.S. Cl. .................................... 106/792; 106/795; 106/797
[58] Field of Search ................ 106/795, 792, 797

[56] References Cited

U.S. PATENT DOCUMENTS

| | | | |
|---|---|---|---|
| 3,794,505 | 2/1974 | Helser et al. | 106/795 |
| 3,902,913 | 9/1975 | Helser et al. | 106/795 |
| 4,075,804 | 2/1978 | Zimmerman | 106/795 |
| 4,131,638 | 12/1978 | Whitaker et al. | 106/795 |
| 4,132,555 | 1/1979 | Barrable | 106/795 |
| 4,144,121 | 3/1979 | Otouma et al. | 106/795 |
| 4,549,970 | 10/1985 | Krijgsman | 106/795 |
| 4,873,141 | 10/1989 | Popovic | 428/357 |
| 4,874,569 | 10/1989 | Kuszyk | 264/60 |

OTHER PUBLICATIONS

*The Merk Index*, 10th Ed., Merck & Co., Inc., 1983, p. 234.

*Primary Examiner*—Karl Group
*Attorney, Agent, or Firm*—Rothwell, Figg, Ernst & Kurz

[57] ABSTRACT

A hydrous calcium silicate based material prepared according to a wet method employing a specific liquid to solid phase ratio and pressures. The resulting hydrous calcium silicate based material comprises predominantly 11.3 Å tobermorite and minor amounts of inorganic or organic fibers. This material has good insulating properties and good mechanical strength.

13 Claims, 1 Drawing Sheet

MATERIAL FOR HEAT AND ELECTRICAL INSULATION WITH A CAPACITY OF SELECTIVE ABSORPTION OF ELECTROMAGNETIC RADIATION SPECTRUM AND VIBRATION, ITS PRODUCTION PROCESS AND USE

This is a continuation of application Ser. No. 07/541,999, filed Jun. 22, 1990, now abandoned.

TECHNICAL FIELD OF THE INVENTION

The present invention pertains to the field of technology for the production of heat and electrical insulation materials which are thermally stable at temperatures up to 1100° C. and are based on hydrous calcium silicates (belonging to the following classes of the International Patent Classification: C 04B 35/22 and C 01B 35/24).

OBJECTIVE OF PRESENT INVENTION

The objective of the present invention is for a new hydrous calcium silicate material and preparation thereof which is thermally stable at temperatures up to 1100° C., having heat insulating properties, a mechanical strength up to 32 kg/cm$^2$, a capability of selective absorption of electromagnetic radiation, vibration damping properties, good electrical resistance, water resistance, resistance to acids and frost, good thermal shock resistance and resistance to various combustible industrial gases.

STATE-OF-THE-ART

Heat insulating material based on hydrous calcium silicates and fibrous raw materials are already known. Commercially available hydrous calcium silicate based materials include, for example, Marilite ®️ 1, Monolux ®️ 40, Monolux ®️ 500, Monolite ®️ and Vidasil ®️.

All known materials based on hydrous calcium silicates may be divided into two categories. Materials belonging to the first category are those having the following technical characteristics:
- Bulk density 600-850 kg/m$^3$,
- Thermal conductivity 0.2-0.35 W/m° C.,
- Maximum working temperatures 150°-850° C.,
- Modulus of rupture 5-17 MN/m$^2$.

Thermal shock resistance, resistance to water and vibration damping properties have not been determined.

The heat insulating material based on a hydrous calcium silicate manufactured under the production process described in Yugoslavian Patent Application No. P-553/85, falls under the second category. This heat insulating material represents an improved product based on hydrous calcium silicates, both for its homogeneous mineral composition and for its technical properties. Its properties have extended the application of hydrous calcium silicate based material to fields which previously had not been thought possible. The mechanical properties of hydrous calcium silicate based material produced in accordance with Yugoslavian Patent Application No. P-553/85, as well as numerous other properties, such as fire retardance, have been capable of withstanding challenging conditions. Thus, this material has been employed in diverse places and under diverse conditions, providing a satisfactory solution for numerous technical problems.

In the application of hydrous calcium silicate based material described in Yugoslavian Patent Application No. P-553/85, it has become apparent that an improvement of its mechanical strength would provide greater application possibilities. As the frequency with which employment of this hydrous calcium silicate based material has increased, stricter standards have been demanded of it, and efforts have been made to find a material having the same scope of employment but with improved physical properties.

The physical properties of the hydrous calcium silicate based material, containing 11 Å tobermorite and produced in accordance with the process described in Yugoslavian Patent Application No. P-553/85 are as follows:

Standard test JUS.U.J. 1.040, point 7 (burning test): The tested samples were not combustable.

Standard test JUS.U.J. 1.060, point 7 (inflammability test): The tested samples were not inflammable and the material was classified into class I.

Bulk density (ASTM C 303) from 220 to 317.5 kg/m$^3$ compressive properties at 5% deformation (ASTM C 165):

| 20° C. | 600° C. | 900° C. |
|---|---|---|
| 1.60 MPa | 1.40 MPa | 1.22 MPA |

Flexural strength (ASTM C 203) 0.91 MPa and Thermal conductivity (JUS U.J. 5.040) depending on the temperatures:

| Mean Temperature | W/m °K. |
|---|---|
| 50 | 0.079 |
| 149 | 0.107 |
| 427 | 0.157 | linear shrinkage at temperatures of 860° C. (ASTM C 356):
- shrinkage per length 2.0%
- shrinkage per width 2.0%
- shrinkage per thickness 2.15%
- weight loss 9.1%

Screw holding strength (ASTM D 1037, ASTM C 656): transverse force of bolt arrest is 25 kg. Resistance to rapid temperature changes (DIN 51068): 20+.

DESCRIPTION OF THE INVENTION

The present invention is for a new process of obtaining a new hydrous calcium silicate based material which is thermally stable at temperatures up to 1100° C., having universal insulation properties, good mechanical strength, as well as good thermal shock resistance, a capability of selective absorption of electromagnetic radiation, vibration damping properties, good electrical resistance, water resistance, resistance to acids, resistance to frost and resistance to various combustable gases.

The new process of the present invention results in the production of a new hydrous calcium silicate based material having thermo-physical properties which are twice as great as those of the hydrous calcium silicate based material disclosed in Yugoslavian Patent Application No. P-553/85. Other physical properties also are increased, thus resulting in a new hydrous calcium silicate based material. The present process differs in the weight:weight ratio of the CaO and SiO$_2$ components. In addition, the amounts of other components employed in the synthesis of the hydrous calcium silicate based material have been varied. A number of the conditions under which the reaction has been carried out also have been changed, including the ratio between the liquid and solid phases, the pressure or temperature at which the reaction between the CaO and SiO₂ takes place and the duration of the reaction. The fiber length of organic and inorganic fibers employed and the quantity of water used also are different. By increasing the pressure and employing an optimal quantity of liquid in relation to the solid phase, better conditions have been obtained for the synthesis of a hydrous calcium silicate designated 11.3 Å tobermorite. The crystalline form and degree of porosity of the 11.3 Å tobermorite, as well as the properties of the fibrous component, affect the physical properties of the hydrous calcium silicate based material of this invention.

In addition to providing an improved hydrous calcium silicate based material, the process of the present invention is more economical than the process described in Yugoslavian Patent Application No. P-553/85. The reaction requires less equipment and energy in the preparation of the hydrous calcium silicate based material because the pulp, formed by mixing the reaction components together, has a reduced liquid to solid phase ratio and does not require any additional treatment steps, such as extraction or purification of the hydrous calcium silicate based material. Hydrous calcium silicate based materials prepared according to the process of the present invention have reproducible physical properties within the ranges described herein. More specifically, the method of the present invention is carried out by adding hydrated lime and pulverized quartz (particle size-maximum of 53 microns) containing $SiO_2$ of at least 97% by weight, in a ratio of $CaO:SiO_2$ of about 0.60:1–0.73:1, successively to an aqueous solution containing about 0.3–0.45% by weight of sodium carboxymethylcellulose and then adding to the aqueous preparation a mixture of water and about 3.5–5.5% by weight (based on the solid phase of the pulp) of organic or inorganic fibers (cellulose based or asbestos and vermiculite and the like, respectively) such that the ratio of liquid phase to solid phase is about 2.9 to 4. The components are mixed together to form a pulp, and sodium hydroxide then is added to the pulp in amounts of about 0.02% by weight, based on the amount of $SiO_2$ in the pulp. The resulting pulp is poured into dies which then are autoclaved at a pressure of about 11.5–12.5 bar for a period of about 16 to 28 hours. The product is removed from the cooled dies and is air-dried at temperatures up to about 250° C.

The method of the present invention results in the formation of a new hydrous calcium silicate based material predominantly comprising 11.3 Å tobermorite having a fibrous structure based on the following equation:

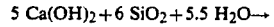

$$5\ Ca(OH)_2 + 6\ SiO_2 + 5.5\ H_2O \rightarrow$$

$$5\ CaO + 6\ SiO_2 + 10.5\ H_2O$$

The properties of the product depend on the amount of CaO and $SiO_2$ incorporated into the hydrous calcium silicate based material. The new hydrous calcium silicate based material comprises about 90% by weight of 11.3 Å tobermorite, from about 3.5–5.5% by weight organic or inorganic fibers and from about 0.3–0.45% by weight of sodium carboxymethylcellulose.

In addition to the amount of CaO and $SiO_2$ incorporated into the product, the size and form of the CaO and $SiO_2$ crystals, their distribution in the product and their microstructure also influence the physical properties of the product. The microstructure of the tobermorite can range from amorphous to an exceptionally fine crystalline structure. The crystals can be in sheet form or fiber form arranged in a radial or an uneven crossed pattern. The texture of the tobermorite is determined by the size of the pores in the material as well as its porosity (ratio of open area to total area expressed as a percentage).

In order to maintain continuous synthesis of hydrous calcium silicate (11.3 Å tobermorite), it is necessary to maintain the proper calcium hydroxide to silicon dioxide to water ratio (see chemical equation).

Other important parameters involved in the synthesis of 11.3 Å tobermorite include the viscosity of the liquid phase and a ratio of free calcium ions and silicone dioxide of from about 0.6:1 to about 0.73:1 in the liquid phase. The ratio of liquid phase to solid phase in the pulp also is crucial in influencing the physical properties of the hydrous calcium silicate based material These are only the basic parameters effecting the technical properties of the material, and it is probable that all interrelationships between the process parameters and the quality of this new material have not yet been determined.

The organic fibers which can be used to practice this invention comprise paper, flax or hemp and are about 5 mm long. Suitable inorganic fibers include but are not limited to, chrysotile asbestos fibers having a length of about 6 mm or vermiculite fibers having a length of about 5 mm. Other mineral fibers can be employed to practice this invention, provided they are thermally stable at a temperature of about 200° C, and they are stable in an alkaline medium.

The heat insulating and fire retarding properties of the hydrous calcium silicate based material of the present invention, as well as its ability to withstand direct contact with molten metal and hot gases, allows for a wide application range.

Examples of some of the new uses for the product of the present invention include, but are not limited to, surface layers of industrial plant hearths in which fuel oil, such as propane, butane or natural gas, are burned and as a protective coating on steel insulation against heat, sound, electromagnetic radiation and the like.

The following examples are only intended to more clearly illustrate the present invention and are not intended to limit its scope.

EXAMPLE 1

1.6 kg of hydrated lime containing 72% by weight of CaO and 1.632 kg of quartz powder with 96% by weight of $SiO_2$, having a particle size of less than 63 microns, were successively added to 9 liters of water containing 12 gm of sodium carboxymethylcellulose. To this suspension, a mixture of 4 liters of water and 161 gm of 4 mm long cellulose fibers was added. The mixed components were poured into a die with the dimensions 0.6×0.2×0.2 m. The die containing the pulp was autoclaved at a pressure of about 11.0–12.5 bar over a period of 18 hours. After the die had cooled, a block with a moisture content of approximately 67% by weight was removed from the die and air-dried at a temperature of approximately 100° C.

EXAMPLE 2

557.6 kg of calcium hydroxide containing 72% by weight of CaO and 565.8 kg of quartz powder containing 98% by weight of $SiO_2$ were successively added to 2600 liters of water in which 5.3 kg of sodium carboxymethylcellulose had been dissolved. To this suspension, 1560 liters of water containing 56.13 kg of 5 mm long cellulose fibers were added. After thoroughly mixing the components, the pulp was poured into dies which then were autoclaved at a pressure of about 11.5–12.5 bar over a period of 14 hours. After cooling, blocks having a moisture content of approximately 67% by weight were removed from the dies and air-dried at temperatures of 200° C.

Physical properties of the hydrous calcium silicate based material of the present invention (Vidasil®-400) are as follows:

SHAPE: Flat plates and tubes
DENSITY: At room temperature 400 kg/m$^3$
BOARDER TEMPERATURE OF APPLICATION IN CONDITIONS OF
LONG EXPLOITATION IS 1000° C.
RAY DIFFRACTION ANALYSIS: 1 Tobermorite
2 Quartz

THERMAL CONDUCTIVITY FOLLOWING THERMAL TREATMENT AT 900° C.

| Temperature °C. | | | Thermal Conductivity |
|---|---|---|---|
| Hot Face | Cold Face | Mean | W/m K. |
| 201 | 27 | 114 | 0.118 |
| 400 | 41 | 220 | 0.127 |
| 800 | 91 | 448 | 0.166 |

SPECIFIC HEAT

| Mean temperature °C. | 65, 209, 320, 427, 483 |
|---|---|
| Specific heat J/kg °K. | 721, 771, 866, 894, 928, 947 |

PRESSURE RESISTANCE

| T °C. | At 5% deformation MPa | To maximum destruction MPa |
|---|---|---|
| room | 3.28 | 4.30 |
| over 900° C. | 2.42 | 4.57 |

FLEXURAL STRENGTH

| Temperature °C. | MPa | PSI |
|---|---|---|
| room | 1.48 | 215 |
| over 900 | 0.61 | 88 |

SCREW HOLDING STRENGTH

| Temperature °C. | Max Load (kg) | Max Load (kg) |
|---|---|---|
| room | 32.7 | 0.32 |
| over 900 | 30.4 | 0.30 |

THERMAL SHOCK RESISTANCE

The hydrous calcium silicate based material, when annealed at a temperature of 1100° C., did not disclose any observable cracking after quenching in cold water. This test was carried out in order to disclose improved thermal shock resistance properties of the hydrous calcium silicate based material of the present invention. The thermal shock resistance of the hydrous calcium silicate based material was determined to be 26.

THERMAL SHOCK RESISTANCE PARAMETER Rst

The Rst parameter value of 44.80 ° C./m ½ was obtained for the hydrous calcium silicate based material treated at 900° C.

ELECTRICAL RESISTANCE MΩ

| Plate width | 0.5 mm | 20 |
|---|---|---|
| Plate width | 10. mm | 200,000 |

MODULUS OF ELASTICITY

| Temperature °C. | GPa | PSi |
|---|---|---|
| room | 1.57 | 227650 |
| over 900 | 0.74 | 107300 |

SHRINKAGE AFTER 24 HOUR HEATING

| Temperature °C. | Shrinkage | | |
|---|---|---|---|
| | Length | Width | Thickness |
| 600 | 1.40% | 1.97% | 0.94% |
| 800 | 3.43% | 2.89% | 2.55% |

TOTAL OPEN POROSITY 80%.

Figure 1:
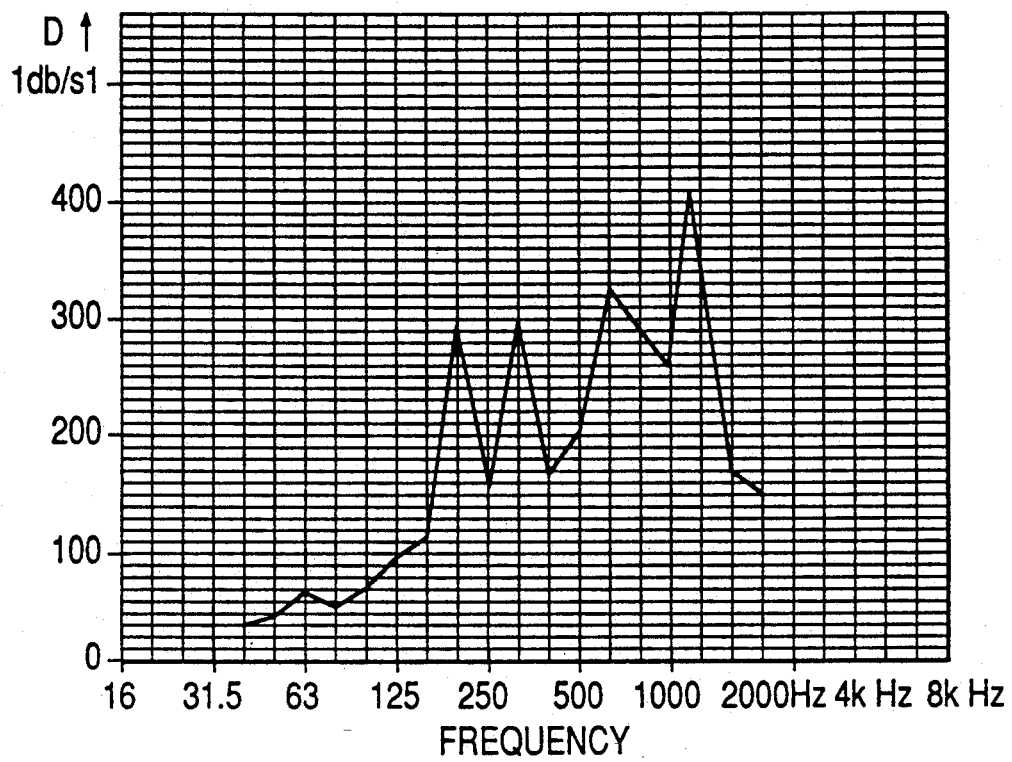
FIG. 1 illustrates the vibration damping properties of a plate made of hydrous calcium silicate based material made in accordance with the process of the present invention.
Figure 2:
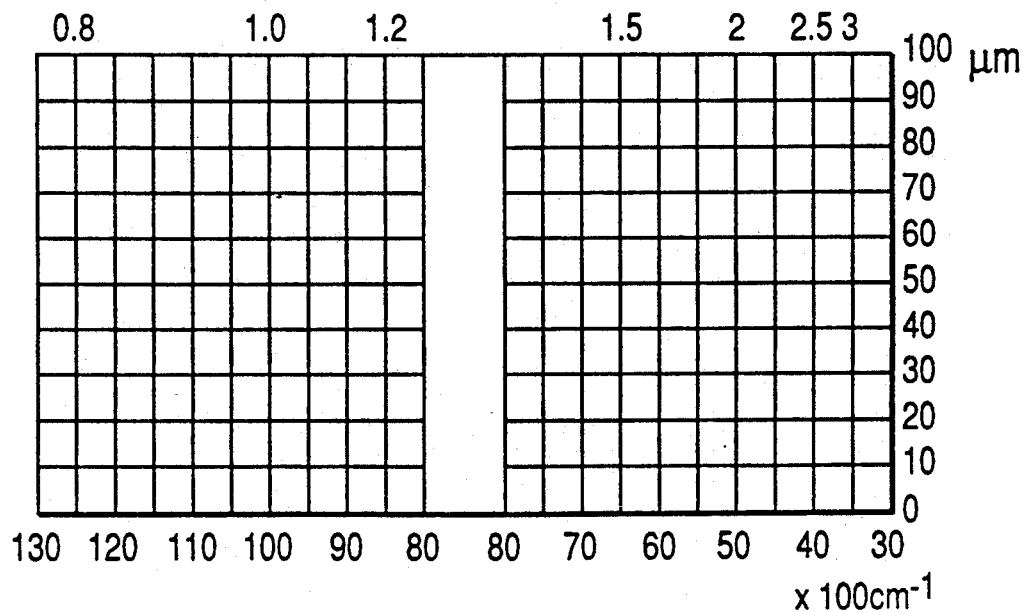
FIG. 2 illustrates ultraviolet radiation spectrum absorption properties exhibited by the hydrous calcium silicate base material made in accordance with the process of the present invention.

I claim:

1. A hydrous calcium silicate material having thermal and electrical insulating properties, sound and vibration damping properties, mechanical strength, electromagnetic radiation absorbing properties, water resistance and resistance to acids, which comprises at least 90% by weight of 11.3 Å tobermorite, about 3.5–5.5% by weight of an organic or inorganic fiber, about 0.3–0.45% by weight of sodium carboxymethylcellulose, the calcium hydrosilicate material comprising a crystalline structure, wherein the material is thermally stable at temperatures as high as about 1100° C., cryogenically stable at temperatures as low as about −180° C. and has a micropore area of at least 60 m$^2$/particle.

2. The hydrous calcium silicate material of claim 1, wherein the material has a bulk density of about 400 kg/m$^3$, a thermal conductivity of about 0.11–0.16 W/mK, a compressive resistance of about 3.2 MPa, a maximum linear shrinkage of about 3.5% after 24 hours of heating at 1,273.15° K., a thermal shock resistance of about 26, a mechanical strength of about 32 kg/cm$^2$, an electrical resistance of sample plates, 10 mm thick, of about 200,000 MΩ and an ability to absorb electromagnetic radiation with a spectrum of about 0.8–3.0 μm.

3. The hydrous calcium silicate material of claim 1, including organic fibers comprising cellulose based material.

4. The hydrous calcium silicate material of claim 3, wherein the cellulose based material comprises paper, flax or hemp fibers about 5 mm in length.

5. The hydrous calcium silicate material of claim 1, including inorganic fibers comprising chrysotile asbestos fibers about 6 mm long or vermiculite fibers about 5 mm long.

6. A material according to claim 1 comprising about 4.7% by weight of an organic or inorganic fiber.

7. A material according to claim 3 comprising about 4.7% by weight of said organic fiber.

8. A material according to claim 4 comprising about 4.7% by weight of said organic fiber.

9. A process for preparing a hydrous calcium silicate material comprising:

(a) successively adding hydrated lime, comprising at least 72% by weight calcium oxide, and pulverized quartz, comprising at least 97% silicon dioxide, to a solution containing about 0.3–0.45% by weight of sodium carboxymethylcellulose to form a suspension, such that the amount of calcium oxide to silicon dioxide is in a ratio of about 0.60:1 to about 0.73:1 by weight;

(b) mixing with the suspension an aqueous mixture of organic or inorganic fibers to form a pulp such that a ratio of liquid phase to solid phase of about 2.9 to 4.0 by weight is formed in the pulp wherein the fibers comprise about 3.5-5.5% by weight of the pulp;

(c) adding sodium hydroxide in an amount of about 0.02% by weight of silicon dioxide in the pulp;

(d) pouring the pulp into a die;

(a) autoclaving the die containing the pulp at a pressure ranging from about 11.0-12.5 bar for about 16-28 hours to form a hard molded calcium hydrosilicate material; and (f) drying the calcium hydrosilicate material.

10. The process of claim 9, including organic fiber comprising a cellulose based material.

11. The process of claim 10, wherein the cellulose based material comprises fibers of paper, hemp or flax about 5 mm in length.

12. The process of claim 9, including inorganic fiber comprising chrysotile asbestos fibers about 5 mm long or vermiculite fibers about 6 mm long.

13. The process of claim 9, wherein the hydrous calcium silicate material is dried at a temperature of about 250° C.

* * * * *